UNITED STATES PATENT OFFICE.

FREDERICK G. KEYES, OF HOBOKEN, NEW JERSEY, ASSIGNOR TO NATIONAL AUTOMATIC REFRIGERATOR COMPANY, A CORPORATION OF NEW JERSEY.

REFRIGERATION.

1,251,538.  Specification of Letters Patent.  Patented Jan. 1, 1918.

No Drawing.    Application filed May 27, 1916.   Serial No. 100,379.

*To all whom it may concern:*

Be it known that I, FREDERICK G. KEYES, a citizen of the United States, and resident of Hoboken, in the county of Hudson and State of New Jersey, have invented new and useful Improvements in Refrigeration, of which the following is a specification.

This invention relates to refrigeration, and more particularly to automatic refrigeration wherein is employed a composition comprising an absorbent, a solvent, and a refrigerant, for example, ammonium nitrate, water and ammonia.

It has been proposed to produce automatic refrigeration by a process involving the use of two liquids comprising a solvent and a refrigerant such as water and ammonia which have, at the same temperature, widely different vapor pressures. The operation of such a system may be conceived with reference to simple apparatus comprising a distilling chamber, a rectifying chamber, a condensing chamber, and a refrigerating chamber, arranged to alternately perform distilling and refrigerating operations. During the first stage the distilling chamber is heated to vaporize a component of the bi-liquid comprising ammonia and some water. The water, having the lower vapor pressure, is condensed in the rectifier and returned to the distilling chamber. The ammonia vapor passes on to the condensing chamber where it is liquefied and caused to flow into the storage tank. During the refrigerating stage the distilling chamber is cooled and the ammonia is allowed to escape through an expansion valve into the refrigerating coils. The ammonia then returns to the distilling chamber where it is absorbed by the component of the bi-liquid remaining therein.

There are numerous objections to the bi-liquid system, one of which is due to the vaporization of some of the solvent along with the refrigerant during the distillation stage which necessitates an intermediate condensing chamber to condense the solvent to prevent its passing on to the storage tank. This involves the use of a motor, gravity mechanism, or other means for conveying the liquid condensed in the intermediate chamber back to the first chamber. Furthermore, it is difficult to control the operation of a bi-liquid system in such a way as to abstract all of the liquid having the lower vapor pressure from the component driven off from the still during the distillation stage, and in practice some of this liquid is liable to pass over to the storage chamber along with the refrigerant. There it accumulates, and unless removed by some special means it is likely to freeze and burst the expansion coils.

It has also been proposed to employ a salt-liquid, that is, a solution of a salt in a liquid, and to employ only two principal chambers, one of which is arranged to be alternately heated and cooled and the other of which may serve as the refrigeration chamber. The principal advantage of using a salt is that the dissolution thereof in the refrigerant brings about a large reduction of the vapor pressure of the refrigerant, and in the case of concentrated solutions this reduction of vapor pressure is extraordinarily large.

The salt-liquid system of refrigeration has proven unsatisfactory in practice, however, chiefly for the reason that it presents the following dilemma: If only sufficient liquid is employed to dissolve the salt the latter precipitates upon distilling all or a part of the liquid from the first chamber into the second chamber; and during the refrigeration period, when the liquid vaporizes and returns in vapor form to the first chamber to be reabsorbed by the salt, the absorption takes place very slowly owing to the fact that the salt, having been precipitated, exists in the solid state. Even after a portion of the salt has been dissolved the absorption takes place slowly owing to the fact that the superficial layer of solution formed over the surfaces of the crystals diffuses with great slowness into the more dilute portions of the mixture, thus hindering rapid absorption of the vapor. On the other hand, if more liquid is employed than is required to dissolve the salt, and if only a portion of the liquid is distilled off, leaving enough in the first chamber to maintain all the salt dissolved, the difference in vapor pressure between the liquid distilled over into the second chamber and the comparatively dilute solution left in the first chamber is so small that the system is inefficient for the well-known reason that a large difference in vapor pressure between the liquids in the two chambers is essential to secure rapid absorption of the refrigerant and thus give efficient and rapid refrigeration. In either event the solution is very viscous, and a mechanical stirrer is ordinarily necessary, thus adding materially to the cost of operation and also involving the use of troublesome packing glands.

Thus, on the one hand a bi-liquid system involves a difficulty due to the necessity of freeing the evolved refrigerating fluid from the less volatile constituent, and on the other hand the use of a very soluble salt leads to difficulties due to the slowness with which the refrigerating liquid evolved from the solution is reabsorbed by the solid salt.

It is the object of my invention to overcome the above difficulties and to provide simple and efficient refrigeration which is well adapted for continuous and automatic use. For this purpose I preferably employ a ternary solution, consisting of three constituent parts, namely, an absorbent, a solvent and a refrigerant, in which the refrigerant may be soluble in the solvent as well as in the absorbent. The particular composition which I preferably employ comprises ammonium nitrate, water and ammonia.

It is a well-known fact that any salt dissolved in a solvent reduces the vapor pressure of the solvent, but the law relating to the relative vapor pressures of solutions of different concentrations is known only for very dilute solutions. The differential equations expressing these laws are only accurate for dilute solutions, and for concentrated solutions it is necessary experimentally to determine which salts possess the property of abnormally lowering the vapor pressures of solvents in which they may be dissolved. When ammonium nitrate is dissolved in liquid ammonia, the lowering of the vapor pressure of the solvent may properly be described as abnormal since it is far greater than would be predicted from the law which holds true for dilute solutions. Moreover, ammonium nitrate is very soluble in ammonia, which is a further desideratum for the purpose of my invention. Thus a very large proportion of the ammonia may be distilled off from my ternary composition without causing a precipitation of any of the ammonium nitrate, at the same time leaving in the first chamber a highly concentrated solution of the nitrate having a much lower vapor pressure than the practically anhydrous ammonia distilled over into the refrigerating chamber. Furthermore, ammonium nitrate is a salt which lowers the vapor pressure of water without diminishing the solubility of ammonia in the mixture; indeed, the presence of the water increases the solubility of ammonia in the mixture.

It is also a well-known fact that with few exceptions a composition exists for a pair of liquids, which has a critical proportion of the two liquids, such that the boiling point of the mixture is unique in that the composition remains unchanged upon distillation at a given temperature. Thus, when a solution having the critical proportion of two liquids is boiled, the gas given off has the same proportion of constituents as the liquid. For example, water and alcohol in the critical proportion form a mixture which, when distilled at a pressure of one atmosphere, passes from the still to the condenser without change of proportion. Owing to the fact that the vapor evolved from the liquid has the same proportion of constituents as the liquid, separation of the two components of the mixture by a process of distillation is physically impossible. In this example the critical mixture comprises water and alcohol approximately in the ratio of one to twenty-three.

I propose to utilize this principle by employing the water and ammonia, or other equivalent solvent and refrigerant, in such proportions that upon heating the ternary solution in the distillation chamber to a suitable temperature, for example to a temperature of the order of 100° C., the ammonia and water will distil over into the refrigeration chamber either in such relative quantities that, at the temperature of the refrigeration chamber, the aforesaid critical proportion will be obtained therein, or in such relative quantities that an excess of refrigerant over the amount required to comprise the critical proportion will exist therein. If an excess of refrigerant passes over, substantially pure refrigerant will evaporate until only a sufficient amount thereof is left to comprise, with the solvent, the critical proportion; and the solvent will then begin to pass off with the refrigerant as a mixture having the said critical proportion. Thus, residual separation of solvent in the refrigeration chamber is impossible, and no solvent will be left behind to accumulate and freeze therein. When employing water and ammonia as the solvent and refrigerant, respectively, and when operating at a temperature of approximately 0° C. in the refrigeration chamber, the aforesaid critical proportion is roughly twenty parts ammonia to one part of water.

Thus it will be seen that the water or other solvent employed has several important functions. In the first place, the solution in the first chamber remains in liquid form during and after the distillation of a large proportion of the anhydrous ammonia, and no salt is precipitated, thus eliminating the objectionable results incident to a precipitation of a salt in the distilling chamber. Moreover, the diminished viscosity of the solution in the distilling chamber, due to the presence of the water remaining after distilling off most of the ammonia and a very small amount of the water, allows a more rapid diffusion and reabsorption of the refrigerant as it returns from the refrigerating chamber.

I therefore contemplate employing water in quantity sufficient to maintain the ammonium nitrate in solution after substantially all the ammonia and a very little of the water has been distilled therefrom, and in quantity not greater than is sufficient to comprise the critical proportion thereof with ammonia in the refrigerating chamber under the desired conditions of temperature and pressure therein during the refrigeration process. When a temperature of the order of 100° C. is employed in the distilling chamber during the distillation process a larger ratio of water to ammonia than one to twenty (substantially the critical ratio at 0° C.) may be employed, inasmuch as the vapor pressure of the water in the ternary solution is lowered to such an extent by the ammonium nitrate that less than the critical proportion of water is distilled off at a temperature of the order of 100° C. even when employing water and ammonia in the ternary composition in the ratio of one to seven, a suitable ratio under ordinary conditions as will now appear.

When employing a temperature of the order of 100° C. in the absorption chamber during the distillation stage and a temperature of the order of 0° C. in the refrigeration chamber, a suitable proportion of the three elements of my preferred composition comprises approximately forty per cent. ammonia, five per cent. water and fifty-five per cent. ammonium nitrate. It is to be understood that this particular mixture is merely an example of suitable proportions of materials which may be employed under the conditions mentioned and that the invention is in no way limited to these particular proportions.

Although I preferably employ a composition comprising ammonium nitrate, water and ammonia, combined in the proportions above set forth, there are other materials which will coöperate in the functional relationship hereinbefore described, and compositions comprising such materials I consider the equivalents of ammonium nitrate, water and ammonia. For example, thiocyanate of ammonia may be employed in lieu of nitrate of ammonia. Furthermore, either the absorbent, the solvent or the refrigerant may consist of two or more combined materials or additional materials may be added, within the scope of my invention, so long as the described functional relationship exists between the various materials.

The solution or composition above described may be used in any form of refrigerating apparatus comprising a distilling chamber, and a refrigerating chamber with means for vaporizing the volatile component and conducting it to the refrigerating chamber, and then re-vaporizing the refrigerant conveying it back for absorption in the distilling chamber. As such apparatus is known and is shown in detail in my application filed January 27, 1917, Serial No. 144,834, as a division of this application, illustration of the same is omitted herefrom.

By way of summary it may be noted that the various elements of the ternary solution should be combined in proportions such that during the distillation period no more of the solvent will pass off with the refrigerant than is sufficient to comprise the critical mixture above referred to and preferably such that less than this amount of solvent will vaporize with the refrigerant. This result can readily be attained when using water and ammonia owing to the fact that the boiling points of these two liquids differ widely, being respectively 100° C. and —33° C. at one atmosphere pressure. Thus the greater part of the water will remain behind with the ammonium nitrate in the distillation chamber during the distilling stage and prevent precipitation of the solid salt. Of course, a small quantity of water will pass over into the refrigerating chamber with the ammonia, but on account of the infinite miscibility of ammonia in water it is possible so to adjust the quantity of water that when the partition of a small amount of water from the ammonium nitrate takes place, say near the end of the distillation period, the water remaining in the distillation chamber keeps the salt in solution and the amount of water carried over into the refrigerating chamber is so small that no precipitation of the ammonium nitrate takes place.

As already mentioned, the amount of solvent employed in the ternary solution depends upon the temperature which it is desired to maintain in and about the refrigerating chamber. The lower this temperature is, the less is the amount of solvent which should be employed to dissolve the solid absorbent salt. And the ternary solution should not be heated to too high a temperature during the distillation period. With a given maximum temperature of the distillation chamber during the distilling stage, and a given minimum temperature of the refrigerating chamber, it is possible to select the proportions of elements in the ternary solution whereby salt will not be precipitated upon the distillation of substantially all of the refrigerant therefrom, and whereby the solvent will not pass to the refrigerating chamber in quantities greater than is sufficient to comprise with the ammonia the aforesaid critical mixture ratio.

It may also be observed that if the system is to operate over a considerable variation of temperatures, the salt should be very soluble in the solvent. This is in effect the condition with ammonium nitrate, and therefore this condition is also provided for in my mixture. Water to the extent of one-tenth the weight of the nitrate is scarcely too much even when a temperature of the order of −18° C. is attained on the refrigerating side. Of course, some ammonia always remains behind along with the nitrate, and the presence of this ammonia appears greatly to decrease the tendency of the nitrate to precipitate.

I claim:

1. A liquid refrigerating composition comprising water as a solvent, an active absorbent component, and a volatile refrigerating component, said components having widely different vapor pressures and their proportions being such that the absorbent remains in liquid form upon the vaporization of substantially all of the refrigerant component.

2. A liquid refrigerating composition comprising a solvent component, an active absorbent and a more volatile component constituting a refrigerant, the proportions of each being such that by application of heat thereto a vapor is given off consisting of the solvent and the refrigerant, the ratio of the former to the latter not being greater than the critical boiling ratio thereof under refrigerating conditions.

3. A liquid refrigerating composition comprising ammonium nitrate, water and ammonia, the proportion of each being such that upon the application thereto of a vaporizing temperature of the order of 100° C. the vapor comprises water and ammonia in such proportion that the ratio of water to ammonia is not greater than the critical boiling mixture thereof at a temperature of the order of 0° C.

4. A refrigerating composition comprising a liquid, an active absorbent dissolved therein and forming an absorbent solution, and a volatile component constituting a refrigerant, freely soluble in said solution, all in such proportions that the liquid maintains the absorbent completely dissolved when substantially all the refrigerant has been removed therefrom.

5. A liquid refrigerating composition comprising water, ammonium nitrate and ammonia combined in such proportions that at a temperature above the boiling point of the ammonia, but considerably below the boiling point of the water in the solution the volatile ammonia may be completely vaporized by ebullition.

6. A refrigerating liquid comprising water as a solvent, ammonium nitrate as an absorbent and ammonia as a refrigerant, combined in a ratio in which the water and ammonia remains constant upon converting the same from a liquid to a gaseous state.

Signed by me at New York, New York, this 25th day of May, 1916.

FREDERICK G. KEYES.